Patented Dec. 8, 1953

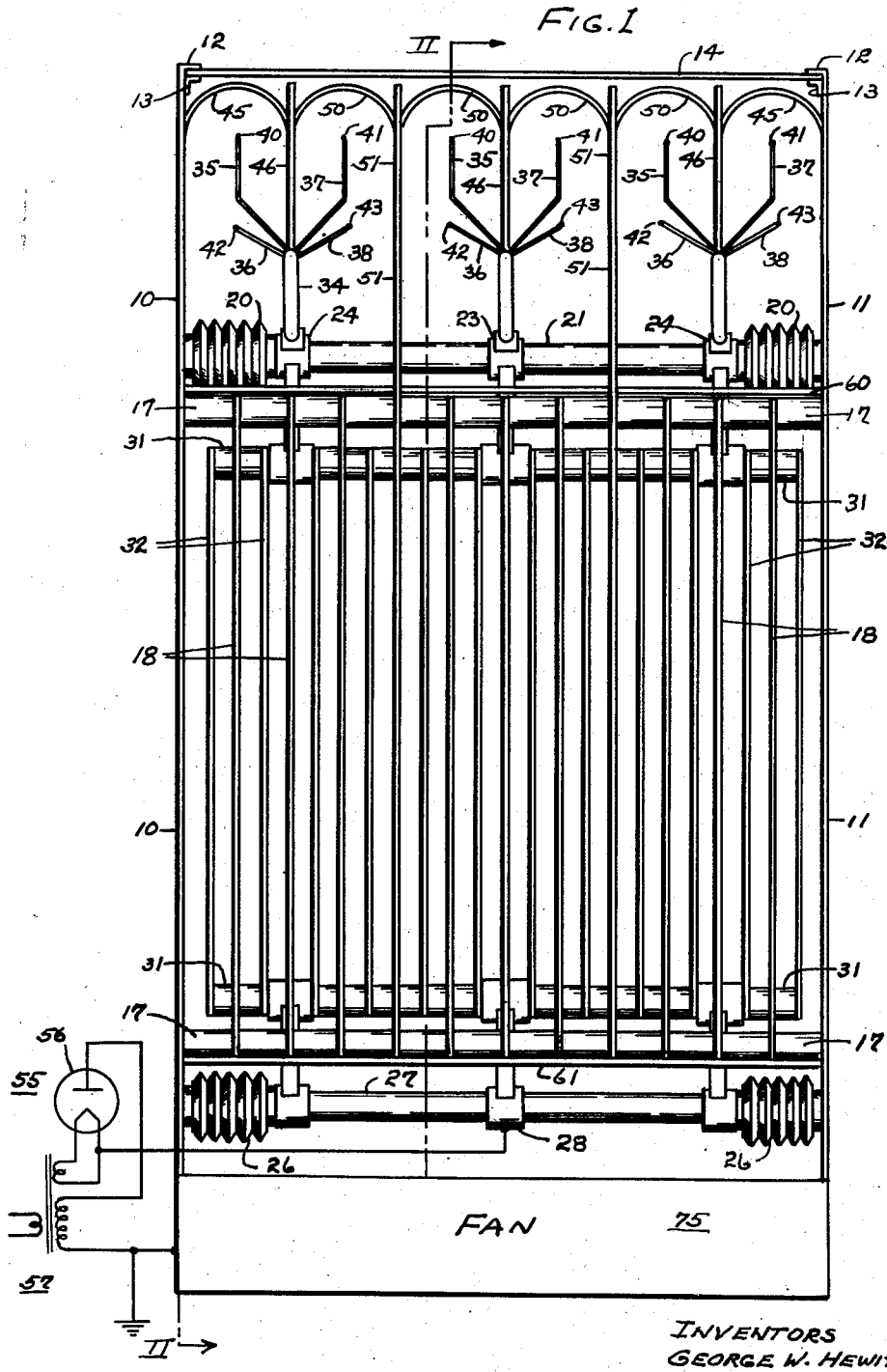

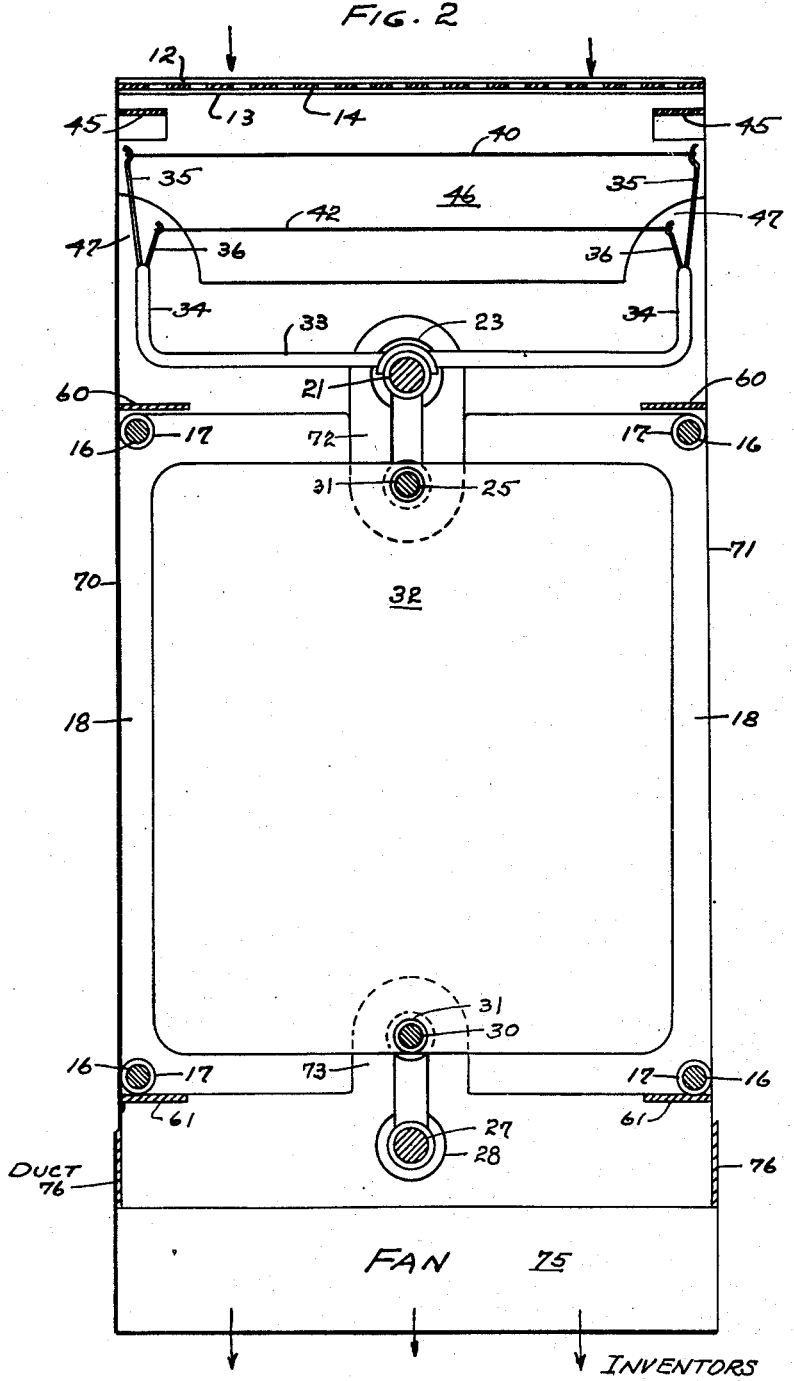

2,661,809

UNITED STATES PATENT OFFICE 2,661,809

ELECTROSTATIC PRECIPITATOR

George W. Hewitt and John S. Lagarias, Pittsburgh, Pa., assignors to Westinghouse Electric Corporation, East Pittsburgh, Pa., a corporation of Pennsylvania Application November 22, 1950, Serial No. 197,054

7 Claims. (Cl. 183—7)

This invention relates to electrostatic precipitators for the removal of small foreign particles, such as dust, from gases, such as air.

The type of electrostatic precipitator most commonly used for removing dust from air, has closely spaced collector plates, between alternate of which, a potential of about 6,000 volts is maintained for providing electrostatic fields for precipitating electrostatically charged dust, and has discharging and non-discharging ionizer electrodes between which, a potential of about 13,000 volts is maintained.

The proper voltage, disregarding proper ionizer wire sizes, for the most effective charging of the dust particles, and for their collection, depends upon the spacing between oppositely charged electrodes. By decreasing this spacing, a lower voltage may be used without loss in efficiency, and by increasing this spacing, a higher voltage may be used without undesired discharges between oppositely charged electrodes.

It has been proposed, for reducing the cost of the direct current power supplies for electrostatic precipitators, to provide the same voltage between the oppositely charged ionizer electrodes and the oppositely charged collector plates. In such precipitators, a single direct current voltage of about 10,000 volts may be used. This, for proper operation, should require that the oppositely charged ionizer electrodes be more closely spaced than when an ionizer voltage of 13,000 volts is used, and should require that alternate collector plates be spaced further apart than when 6,000 volts is maintained therebetween.

In precipitators using rounded ionizer electrodes opposite ionizer wires, the decreased spacing for proper single voltage operation, between the ionizer electrodes will result in such an increase in the air velocity therebetween, unless the rated velocity is decreased, that adequate charging of the dust particles, is less likely to be accomplished due to the decreased time of charging. This problem is overcome by this invention by using flat ionizer electrodes which do not protrude towards the ionizer wires, opposite the latter.

Another proposal for a reduction in the cost of a direct current power supply for a single voltage electrostatic precipitator, has been to use a single half-wave rectifier for changing alternating current to direct current, and to use two ionizer wires instead of one, between adjacent non-discharging ionizer electrodes, one of the wires being so spaced downstream with respect to gas flow from the other, that for a constant, predetermined air velocity, the air which passes the upstream wire during a trough in the ripple voltage from the rectifier, passes the downstream wire when the voltage is at the next peak. This enables, where a constant air velocity can be maintained, the cost of the filtering equipment of the power supply to be reduced.

However, when such wires are spaced so closely together, they each influence the action of the other, and greatly reduce the total ionization current. This disadvantage is avoided by this invention by spacing such wires such a distance apart that the air passing the upstream wire during a trough in the ripple voltage, will pass the downstream wire not at the next peak in the ripple voltage, but a peak following the next peak.

Another disadvantage of the prior electrostatic precipitators using pairs of ionizer wires between adjacent non-discharging ionizer electrodes, is that the two wires were supported by common spring supports in such a way that one of the wires had less tension than the other wire, resulting in excessive vibration in the wire having least tension. This disadvantage is avoided by this invention by using a separate spring support for each ionizer wire.

Another disadvantage of the prior electrostatic precipitators using pairs of ionizer wires between adjacent non-discharging ionizer electrodes, is that the spring supports for the wires were attached to relatively large metal supports which converged towards the ends of the wires, and adjacent their ends, were so close to the wires as to reduce the voltage gradient at the wires. This disadvantage is avoided by this invention, by providing that the relatively large metal supports extend parallel the wires between their ends and so spaced therefrom that the voltage gradient near the wire ends is not greatly reduced.

Another disadvantage of the prior electrostatic precipitators using but a single voltage for the ionizer and collector electrodes, is that since the high-potential collector plates had to be recessed further in from the grounded plate edges than when lower voltages are maintained between the high potential and grounded plates, there were low-gradient regions which extended along the entire lengths of the collector plates, from their upstream ends to their downstream ends in the direction of air flow, in which regions reduced collection took place. This invention minimizes the escape of dust particles in such regions by providing baffles for directing the air into the high-gradient regions between the plates.

An object of this invention is to reduce the air velocity between the oppositely charged ionizer electrodes of an electrostatic precipitator using the same voltage for the ionizer and collector electrodes, for providing increased charging time.

Another object of the invention is to increase the ionization efficiency of an electrostatic precipitator using the same voltage for the ionizer and collector electrodes.

Another object of the invention is to simplify the ionizer electrode assembly of an electrostatic precipitator using the same voltage on the ionizer and collector electrodes.

Another object of the invention is to increase the collection efficiency of an electrostatic precipitator using the same voltage for the ionizer and collector electrodes.

The invention will now be described with reference to the drawing, of which:

Fig. 1 is a side elevation of an electrostatic precipitator embodying this invention, and Fig. 2 is a sectional view along the lines II—II of Fig. 1.

The precipitator illustrated has the end walls 10 and 11 having the channels 12 and 13 at their upstream ends, and in which the perforated baffle plate 14 is slidably positioned, and which forms the air inlet of the precipitator.

The four metal tie rods 16 are attached at their ends to the end plates 10 and 11, and have the metal spacers 17 thereon which contact and space apart, the grounded collector plates 18, the outer spacers spacing the outer collector plates 18 from the end plates 10 and 11, the latter also serving as grounded collector electrodes where they extend parallel the plates 18.

The insulators 20 are attached at their outer ends to the end plates 10 and 11, above the upstream ends of the plates 18, and have the metal rod 21 attached to and extending between, their inner ends. The rod 21 extends through the upper portions of the central, metal support 23 and the end, metal supports 24, through the lower portions of which, extends the metal tie rod 25, the supports 23 and 24 being attached to the rods 21 and 25.

The insulators 26 are attached at their outer ends to the downstream ends of the end plates 10 and 11, and have the metal rod 27 connected to and extending between their inner ends. The rod 27 extends through the lower end of the central metal plate support 28 to which it is attached. The metal tie rod 30 extends through the upper end of the support 28.

The tie rods 25 and 30 have the metal spacers 31 thereon which contact and space apart the high potential collector plates 32.

The ionizer wire supports 33 are attached to the upper ends of the supports 23 and 24, and have portions between their ends extending parallel the upstream edges of the collector plates, and have end portions 34 turned perpendicular thereto. The end portions 34 have the upstream ionizer wire spring supports 35 and the downstream ionizer wire supports 36 extending to one side therefrom, towards the end plate 10, and have the upstream ionizer wire spring supports 37 and the downstream ionizer wire spring supports 38 extending to the other side thereof towards the end plate 11. The upstream ionizer wires 40 and 41 are attached at their ends to the upstream ends of the supports 35 and 37 respectively, and the downstream ionizer wires 42 and 43 are attached at their ends to the upstream ends of the supports 36 and 38, respectively.

The metal, outer, semi-cylindrical baffles 45 are attached along their outer edges to the end plates 10 and 11, and along their inner edges to the ionizer electrodes 46 which are flat metal plates extending parallel the end plates, and which have the cut-outs 47 at their ends adjacent the end portions 34 of the ionizer supports 33.

The metal, inner semi-cylindrical baffles 50 are attached along one of their sides to the ionizer electrode plates 46 and along the opposite sides to the extensions 51 of every fourth grounded collector plate 18.

The electrode plates 46 are aligned with the centers of the end portions 34 of the ionizer wire supports 33. The ionizer wires 40 and 41 are on the axes of the semi-cylindrical baffles, and the wires 42 and 43 are parallel to such axes. Each pair of ionizer wires thus extends midway between a grounded end plate 10 or 11, and a grounded electrode plate 46, or between a grounded plate extension 51 and a grounded electrode plate 46. The grounded plate portions on opposite sides of the centrally located ionizer wires act as non-discharging ionizer electrodes while the wires act as discharging electrodes.

The cut-outs 72 in the grounded plate extensions 51 provide clearance openings around the rods 21 and 25.

The cut-outs 73 in the grounded plates 18, provide clearance openings for the tie rods 30, the spacers 31 on the tie rods 30, and the upper portion of the support 28.

The baffles 45 and 50 prevent the air to be ionized from passing directly over the low-gradient ionizer wire portions near the spring supports 35, 36, 37 and 38, and direct it over the high-gradient portions of the wires, thus increasing the effectiveness of the electrostatic charging of the dust particles. These baffles also provide additional grounded ionizer electrode surface near the wire ends, thus increasing the ionization current, these two effects preventing air from passing through the ionizer chamber without passing through high ionizer current regions.

The conventional, direct current power supply 55 employs a half-wave rectifier tube 56 energized by the step-up transformer 57, the cathode of the tube supplying for example, +10,000 volts to the insulatedly supported collector plates 32 and to the ionizer wires which are electrically connected thereto through the supports 28 and 32, the supports 23 and 24, the rod 21 and the support 33, the negative terminal of the power supply being grounded and connected to the end plates 10 and 11, and to the grounded collector plates 18.

Since the voltage at the ionizer wires is less than that usually employed, they have to be spaced closer to the non-discharging ionizer electrodes for providing adequate ionization current. In prior precipitators using the same voltage at the ionizer and the collector plate electrodes, the non-discharging ionizer electrodes were curved opposite the ionizer wires and bulged towards same. Crowding such electrodes more closely together for providing the desired ionization current, would result in constricted space and in a resulting increased velocity between the ionizer electrodes. This would result in a substantially reduction in the electrostatic charging of the dust particles due to their decreased time of exposure in the ionization field.

The flat, non-discharging electrodes of this invention do not produce any increase in air velocity between the ionizer electrodes, the spacing and other dimensions being selected to provide essentially the same velocity between the ionizer electrodes and between the collector plates.

The outer edges of the high potential plates, due to the high potential thereon, must be spaced a substantial distance from the open sides 70 and 71 where grounded surfaces may be positioned, for avoiding spark-over, and in prior precipitators having the same voltage on the ionizer and collector electrodes, poorly cleaned air passed through such low-gradient spaces. This invention avoids this disadvantage by providing the plate baffles 60 and 61 at the upstream and downstream edges of the grounded collector plates, which are attached at their ends to the end plates 10 and 11, and which extend inwardly from the open sides 70 and 71 respectively, of the collector, over such spaces and direct the air into the high-gradient areas between the grounded and the high potential collector plates.

The precipitator may be inserted into a duct 76, a portion of which is shown by Fig. 2 of the drawing, with opposite sides of the duct closing the open sides 70 and 71 of the precipitator. The fan 75 connected to the duct draws air to be cleaned through the precipitator.

For a power supply using half-wave rectification operating on 60 cycles per second line frequency, and with the fan 75 providing 340 feet per minute air velocity, for example, through the ionizer chamber, the trough to peak spacing of the ripple voltage would be calculated as follows:

340 feet per minute × 12 = 4080 inches per minute
4080 ÷ 60 = 68 inches per second
68 ÷ 120 (one-half 60 cycle frequency) = .566 inch This spacing between the upstream and the downstream ionizer wires is too close for avoiding interference between the wires, so this invention spaces the upstream wires substantially three times the trough to peak spacing or another odd multiple thereof, whereby the air passing the upstream wire at the trough in the ripple voltage, will still pass the downstream wire at a voltage peak, yet the wires are far enough apart so that interaction is avoided.

As illustrated by the drawing, the upstream and downstream wires are each supported by a separate tensioning spring, whereby the tension in each wire is independent of that in the other. In prior precipitators using upstream and downstream wires, both wires were supported at corresponding ends from a single tensioning spring, resulting in unequal tension in the wires and in undesired vibration in the one most slack.

By slidably supporting the perforated baffle plate 14 in the channels 12 and 13 at the upstream ends of the end plates 10 and 11, it may easily be removed for providing access to the ionizer electrodes as for servicing or cleaning them.

In operation, the fan 75 draws air or another gas to be cleaned, through the inlet 14, the air being ionized during its passage between the ionizer wires and the flat plates forming the non-discharging ionizer electrodes. The air passing the upstream wires 40 and 41 during a trough of the ripple voltage from the power supply 55, will pass the downstream wires 42 and 43 during a peak of the ripple voltage, so that satisfactory ionization will be provided despite the lack of filter capacity other than that provided by the collector plates.

The dust particles which are electrostatically charged through the ionization process then pass between the collector plates upon which they are deposited as a result of the electrostatic fields maintained between adjacent plates.

While one embodiment of the invention has been described for the purpose of illustration, it should be understood that the invention is not limited to the exact apparatus and arrangement of apparatus illustrated, since modifications thereof may be suggested by those skilled in the art without departure from the essence of the invention.

What we claim as our invention, is:

1. An electrostatic precipitator having an ionizer zone and a collector zone, comprising end plates common to both of said zones, collector plates in said collector zone, between and supported from said end plates and electrically connected thereto, one of said collector plates having a portion extending into said ionizer zone, an ionizer plate supported in said ionizer zone midway between one of said end plates and said plate portion, and having an inner end terminating short of said collector zone, an ionizer wire support in alignment with said ionizer plate between said inner end and said collector zone, resilient ionizer wire supporting arms supported from the ends of said support and extending therefrom midway between said one end plate and said ionizer plate, resilient ionizer wire supporting arms supported from said ends of said support and extending therefrom midway between said ionizer plate and said plate portion, and ionizer wires supported from said arms.

2. An electrostatic precipitator having an ionizer zone and a collector zone, comprising end plates common to both of said zones, collector plates in said collector zone between and supported from said end plates and electrically connected thereto, one of said collector plates having a portion extending into said ionizer zone, an ionizer plate supported in said ionizer zone midway between one of said end plates and said plate portion, and having an inner end terminating short of said collector zone, an ionizer wire support in alignment with said ionizer plate between said inner end and said collector zone, an upstream ionizer wire and a downstream ionizer wire midway between said one end plate and said ionizer plate, an upstream ionizer wire and a downstream ionizer wire midway between said ionizer plate and said plate portion, and means including separate spring tensioning means for supporting each of said wires from the ends of said support.

3. An electrostatic precipitator having an ionizer zone and a collector zone, comprising collector plates in said collector zone, a pair of said plates having portions extending into said ionizer zone, an ionizer plate in said ionizer zone supported midway between said plate portions and electrically connected thereto and having an inner end terminating short of said collector zone, an ionizer wire support in alignment with said ionizer plate between said inner end and said collector zone, resilient ionizer wire supporting arms supported from the ends of said support and extending therefrom midway between said ionizer plate and one of said plate portions, resilient ionizer wire supporting arms supported from the ends of said support and extending therefrom midway between said ionizer plate and the other of said plate portions, and ionizer wires supported from said arms.

4. An electrostatic precipitator having an ionizer chamber and a collector chamber, comprising collector plates in said collector chamber, a pair of said plates having portions extending into said ionizer chamber, an ionizer plate supported in said ionizer chamber midway between said plate portions and electrically connected thereto and having an inner end terminating short of said collector chamber, an ionizer wire support in alignment with said ionizer plate between said inner end and said collector chamber, an upstream ionizer wire and a downstream ionizer wire midway between said ionizer plate and one of said plate portions, an upstream ionizer wire and a downstream ionizer wire midway between said ionizer plate and the others of said plate portions, and means including separate spring tensioning means for independently supporting each of said wires from the ends of said support.

5. An electrostatic precipitator as claimed in claim 1 in which the ionizer plate has cut-out portions adjacent said support ends.

6. An electrostatic precipitator as claimed in claim 2 in which the ionizer plate has cut-out portions adjacent said support ends.

7. An electrostatic precipitator having an ionizer zone and a collector zone, means for passing air at a constant velocity through said ionizer zone, two sets of alternately arranged plates in said collector zone, non-discharging ionizer electrodes in said ionizer zone, upstream and downstream ionizer wires between said electrodes, and means for applying ripple voltage to said ionizer wires and electrodes and to said plates, said last mentioned means comprising a half-wave rectifier having a cathode connected to the plates of one of said sets, and an anode connected to the plates of the other of said sets, said wires being connected to the plates of one of said sets, and said electrodes being connected to the plates of the other of said sets, said wires being spaced apart a distance in the direction of air flow which is an odd multiple of the distance air at said velocity will travel during a trough to peak period of said ripple voltage.

GEORGE W. HEWITT.
JOHN S. LAGARIAS.

References Cited in the file of this patent
UNITED STATES PATENTS

| Number | Name | Date |
|---|---|---|
| 1,343,285 | Schmidt | June 15, 1920 |
| 2,255,677 | Penney | Sept. 9, 1941 |
| 2,382,254 | Penney et al. | Aug. 14, 1945 |
| 2,542,035 | Klemperer | Feb. 20, 1951 |